United States Patent
Dojo et al.

(10) Patent No.: US 9,791,995 B2
(45) Date of Patent: Oct. 17, 2017

(54) FORM INPUT/OUTPUT APPARATUS, FORM INPUT/OUTPUT METHOD, AND PROGRAM

(71) Applicant: PFU Limited, Ishikawa (JP)

(72) Inventors: Go Dojo, Ishikawa (JP); Tomohiro Hayashi, Ishikawa (JP); Yusuke Mizuno, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 147 days.

(21) Appl. No.: 14/040,265

(22) Filed: Sep. 27, 2013

(65) Prior Publication Data

US 2014/0096074 A1 Apr. 3, 2014

(30) Foreign Application Priority Data

Sep. 28, 2012 (JP) ................................ 2012-218095

(51) Int. Cl.
*G06F 3/048* (2013.01)
*G06F 3/0481* (2013.01)
*G06F 3/0488* (2013.01)
*G06F 3/041* (2006.01)
*G06F 3/0484* (2013.01)

(52) U.S. Cl.
CPC ........ *G06F 3/04812* (2013.01); *G06F 3/0418* (2013.01); *G06F 3/0488* (2013.01); *G06F 3/04842* (2013.01); *G06F 2203/04806* (2013.01)

(58) Field of Classification Search
CPC ... G06F 3/0481; G06F 3/0482; G06F 3/04812
See application file for complete search history.

(56) References Cited

U.S. PATENT DOCUMENTS

| 7,844,914 | B2 | 11/2010 | Andre et al. |
| 8,013,839 | B2 | 9/2011 | Ording et al. |
| 8,312,374 | B2 * | 11/2012 | Ozawa et al. ............... 715/702 |

(Continued)

FOREIGN PATENT DOCUMENTS

| CN | 101263448 A | 9/2008 |
| CN | 102439537 A | 5/2012 |

(Continued)

OTHER PUBLICATIONS

Office Action Chinese Patent Application No. 201310449919.4 dated Mar. 3, 2016.

(Continued)

*Primary Examiner* — Anil N Kumar
(74) *Attorney, Agent, or Firm* — McDermott Will & Emery LLP (57) ABSTRACT

In an embodiment of the present invention, region definition data, which defines a touch region, is stored such that the touch region is associated with a display region that is displayed, as an input item to which a touch input can be made, on a display unit, the touch region being a region in which it is recognized that a touch input is made to the input item, the touch region is dynamically changed in accordance with a priority of the input item, control is performed such that at least the input item is displayed on the display unit and a touch input is made to the input item via a touch input unit by a user, and, when a position to which a touch input is made is within the changed touch region, it is determined that an input is made to the input item.

8 Claims, 7 Drawing Sheets

(56) References Cited

U.S. PATENT DOCUMENTS

| | | | |
|---|---|---|---|
| 2005/0225540 A1 | 10/2005 | Kawakami et al. | |
| 2006/0085757 A1 | 4/2006 | Andre et al. | |
| 2009/0064047 A1* | 3/2009 | Shim et al. | 715/835 |
| 2010/0295799 A1* | 11/2010 | Nicholson | G06F 1/1626 345/173 |
| 2011/0179374 A1 | 7/2011 | Yagi et al. | |
| 2011/0219105 A1 | 9/2011 | Kryze et al. | |
| 2011/0276528 A1 | 11/2011 | Shioiri | |
| 2011/0283228 A1 | 11/2011 | Hiraiwa et al. | |
| 2012/0236036 A1* | 9/2012 | Kao | 345/661 |
| 2013/0125066 A1* | 5/2013 | Klein et al. | 715/862 |
| 2015/0113483 A1* | 4/2015 | Van Der Westhuizen et al. | 715/850 |

FOREIGN PATENT DOCUMENTS

| | | |
|---|---|---|
| JP | 9-258669 A | 10/1997 |
| JP | 10-207699 A | 8/1998 |
| JP | 2000-66817 A | 3/2000 |
| JP | 2000-231446 A | 8/2000 |
| JP | 2002-108815 A | 4/2002 |
| JP | 2005-115483 A | 4/2005 |
| JP | 2005-284379 A | 10/2005 |
| JP | 2006-344245 A | 12/2006 |
| JP | 2009-0509234 A | 3/2009 |
| JP | 2010-503125 A | 1/2010 |
| JP | 2010-079441 A | 4/2010 |
| JP | 2010-097466 A | 4/2010 |
| JP | 2011-150489 A | 8/2011 |
| JP | 2011-187058 A | 9/2011 |
| JP | 2011-192215 A | 9/2011 |
| JP | 2011-242821 A | 12/2011 |
| JP | 2012-048417 A | 3/2012 |
| TW | 201237734 A | 9/2012 |
| WO | 2007/032843 A2 | 3/2007 |
| WO | 2008/030880 A1 | 3/2008 |
| WO | 2009/069392 A1 | 6/2009 |
| WO | 2010-084973 A1 | 7/2010 |

OTHER PUBLICATIONS

Notification of Reasons for Refusal Japanese Patent Application No. 2012-218095 dated Aug. 16, 2016 with full English translation.

K. K. Ashisuo, "Noren e.Form Server" <htp://noren.ashisuto.co.jp/products/ef/outline/index.html> (English translation of the relevant part).

Cimtops Corporation "ConMas i-Reporter" <http://conmas.jp/about.html> ((English translation of the relevant part)).

Decision of Refusal Japanese Patent Application No. 2012-218095 dated Mar. 2017 with English translation.

* cited by examiner

| | | | | | |
|---|---|---|---|---|---|
| | \multicolumn{5}{c}{} | |
| | \multicolumn{5}{c}{WORK [PLAN · CHECK] SHEET} | |
| | Case ID: | | DATE OF WORK: | WORKER: | |
| \multicolumn{3}{c}{PROCESS} | ITEM | CHECK | |
| SCHEDULE | RESULT | PLAN | | | |
| | | · PRIOR CONFIRMATION | PRE-WORK CONFIRMATION | | |
| | | | CONFIRM AAA | ☐ | ← DISPLAY REGION |
| | | | PREPARE BBB | ☐ | ← TOUCH REGION |
| | | | CONFIRM CCC | ☐ | |
| | | | | | |
| | | ·WORK PREPARATION, CONFIRMATION, EXPLANATION | CONFIRM DDD | - | |
| | | | IDENTIFY EEE | ☐ | |
| | | | CONFIRM FFF | ☐ | |
| | | | CONFIRM GGG | ☐ | |
| | | | EXPLAIN HHH | ☐ | |
| | | | | | |

| | ITEM | CHECK | |
|---|---|---|---|
| | PRE-WORK CONFIRMATION | | |
| | CONFIRM AAA | – | |
| | PREPARE BBB | ☐ | ←DISPLAY REGION A / TOUCH REGION A |
| | CONFIRM CCC | ☐ | ←DISPLAY REGION B / TOUCH REGION B |
| | | | |
| | CONFIRM DDD | – | |
| | IDENTIFY EEE | ☐ | |
| | CONFIRM FFF | ☐ | |
| | CONFIRM GGG | ☐ | |
| | EXPLAIN HHH | ☐ | |

FIG.6

| | ITEM | CHECK | |
|---|---|---|---|
| | PRE-WORK CONFIRMATION | | |
| | CONFIRM AAA | – | |
| | PREPARE BBB | ☑ | |
| | CONFIRM CCC | ☑ | |
| | | | |
| | CONFIRM DDD | – | ←TOUCH REGION A |
| | IDENTIFY EEE | ☑ | ←DISPLAY REGION A |
| | CONFIRM FFF | ☐ | ←DISPLAY REGION B |
| | CONFIRM GGG | ☐ | ←TOUCH REGION B |
| | EXPLAIN HHH | ☐ | |

FIG.7

| | ITEM | CHECK | |
|---|---|---|---|
| | PRE-WORK CONFIRMATION | | |
| | CONFIRM AAA | – | |
| | PREPARE BBB | ☑ | 1 |
| | CONFIRM CCC | ☑ | 2 |
| | | | |
| | CONFIRM DDD | – | |
| | IDENTIFY EEE | ☑ | 3 |
| | CONFIRM FFF | ☐ | 4 |
| | CONFIRM GGG | ☐ | 5 |
| | EXPLAIN HHH | ☐ | 6 |
| | | | |

INPUT ORDER

ALREADY INPUT (1, 2)

TOUCH REGION

FIG.8

| | ITEM | CHECK |
|---|---|---|
| | PRE-WORK CONFIRMATION | |
| | CONFIRM AAA | – |
| | | ☐ |
| | | ☐ |
| | | – |
| | | ☐ |
| | | ☐ |
| | CONFIRM GGG | ☐ |
| | EXPLAIN HHH | ☐ |

ENLARGED DISPLAY

DENSE PORTION

FIG.9

|  | ITEM | CHECK |
|--|--|--|
|  | PRE-WORK CONFIRMATION |  |
|  | CONFIRM AAA | - |
|  | PREPARE BBB | ☐ |
|  | CONFIRM CCC | ☐ |
|  |  |  |
|  | CONFIRM DDD | - |

----TOUCH REGION

FIG.10

[NATURAL HOT SPRING]
CARDMEMBER APPLICATION FORM
PLEASE FILL IN RELEVANT PARTS SURROUNDED
BY BOLD LINES.

WOULD YOU LIKE TO RECEIVE
SPECIAL DM ?    ☐ YES   ☐ NO

TOUCH REGION Y   TOUCH REGION N

FIG.11

GESTURE INPUT REGION

| SERVICE | ☐ DELIVERY OF DM  ☐ EMAIL NOTIFICATION |
| NAME | |
| ADDRESS | |

FIG.12

[TYPE OF GESTURES]

· 「✓」
· 「○」
· 「—」
· 「 | 」
· 「1」 (NUMBERS, SUCH AS 1, 2, 3, ...)
· 「A」 (ALPHABETICAL CHARACTERS, SUCH AS A, B, C, ...)
· ARBITRARY SETTING

FORM INPUT/OUTPUT APPARATUS, FORM INPUT/OUTPUT METHOD, AND PROGRAM

CROSS-REFERENCE TO RELATED APPLICATION

This application is based upon and claims the benefit of priority from Japanese Patent Application No. 2012-218095, filed Sep. 28, 2012, the entire contents of which are incorporated herein by reference.

BACKGROUND OF THE INVENTION

1. Field of the Invention

The present invention relates to a form input/output apparatus, a form input/output method, and a program.

2. Description of the Related Art

Recently, with the widespread use of mobile devices, such as tablet terminals, the commercial usage thereof has accelerated on the back of the consumer usage. As an example of introducing mobile devices to the commercial usage, there are many cases of mobile devices being used to promote paperlessness by digitizing conventional paper-based merchandise catalogs, work manuals, and the like. Moreover, mobile devices are used for inputting data to forms and the number of corresponding products for that purpose has been increasing (see K. K. Ashisuto, "NOREN e.Form Server", [online], 2012, K. K. Ashisuto, [Searched on H.24.09.12], Internet <URL:http://noren.ashisuto.co.jp/products/ef/outline/index.html>, and CIMTOPS CORPORATION, "ConMas i-Reporter", [online], 2012, CIMTOPS CORPORATION, [Searched on H24.09.12], Internet <URL:http://conmas.jp/>).

Conventionally, a technology has been developed in which a device, such as a tablet terminal, that includes a touch panel is controlled such that an input is made as intended by the user.

For example, a technology is known in which, in order to correct the displacement, due to the thickness structure of a display screen and a transparent tablet, and the like, between the position on the screen that an operator intends to touch and the position that an operator actually touches, the history of input coordinates is stored and a correction value is calculated on the basis of their distribution and the like, thereby correcting input coordinates (see Japanese Laid-open Patent Publication No. 2000-231446).

Moreover, a technology is known that reduces key typing errors by providing a non-displayed virtual keyboard, which corresponds to a keyboard on the display screen, by setting a region, in which it is recognized that an input is made, for each key (see Japanese National Publication of International Patent Publication No. 2009-509234).

Moreover, a technology is known that enables a user to make an input as intended by adaptively determining, on the basis of the first position corresponding to, for example, the center of a contact area on the touch panel, the second position, which is offset from the first position, and by determining whether an input is made on the basis of the positional relationship between the second position and each user interface object, a character that is expected to be input, and the like (see Japanese National Publication of International Patent Application No. 2010-503125).

However, in the conventional touch input technologies, there is a problem in that because the input history and the like of an operator need to be collected, they cannot be immediately applied to a touch input to the items, such as check boxes and radio buttons, that are small when displayed and are densely arranged.

SUMMARY OF THE INVENTION

It is an object of the present invention to at least partially solve the problems in the conventional technology.

A form input/output apparatus according to one aspect of the present invention includes at least a touch input unit, a display unit, a storing unit, and a control unit, wherein the storing unit stores region definition data that defines a touch region such that the touch region is associated with a display region that is displayed, as an input item to which a touch input is capable of being made, on the display unit, the touch region being a region in which it is recognized that a touch input is made to the input item, and the control unit includes a touch region changing unit that dynamically changes the touch region in accordance with a priority of the input item, a touch input control unit that performs control such that at least the input item is displayed on the display unit and a touch input is made to the input item via the touch input unit by a user, and an input determining unit that, when a position to which a touch input is made by the touch input control unit is within the touch region that is changed by the touch region changing unit, determines that an input is made to the input item.

A form input/output method according to another aspect of the present invention is performed by a form input/output apparatus that includes at least a touch input unit, a display unit, a storing unit, and a control unit, wherein the storing unit stores region definition data that defines a touch region such that the touch region is associated with a display region that is displayed, as an input item to which a touch input is capable of being made, on the display unit, the touch region being a region in which it is recognized that a touch input is made to the input item, the method includes a touch region changing step of dynamically changing the touch region in accordance with a priority of the input item, a touch input controlling step of performing control such that at least the input item is displayed on the display unit and a touch input is made to the input item via the touch input unit by a user, and an input determining step of, when a position to which a touch input is made in the touch input controlling step is within the touch region that is changed in the touch region changing step, determining that an input is made to the input item, and the touch region changing step, the touch input controlling step, and the input determining step are performed by the control unit.

A computer-readable recording medium according to still another aspect of the present invention stores therein a computer program that is executed by a form input/output apparatus that includes at least a touch input unit, a display unit, a storing unit, and a control unit, wherein the storing unit stores region definition data that defines a touch region such that the touch region is associated with a display region that is displayed, as an input item to which a touch input is capable of being made, on the display unit, the touch region being a region in which it is recognized that a touch input is made to the input item, and the program causes the control unit to execute a touch region changing step of dynamically changing the touch region in accordance with a priority of the input item, a touch input controlling step of performing control such that at least the input item is displayed on the display unit and a touch input is made to the input item via the touch input unit by a user, and an input determining step of, when a position to which a touch input is made in the touch input controlling step is within the touch region that is changed in the touch region changing step, determining that an input is made to the input item.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram schematically illustrating a touch region on a display screen enlarged by a touch region changing unit 102a;

FIG. 9 is a diagram illustrating an example of a region that is automatically detected as a touch region by the touch region changing unit 102a;

FIG. 10 is a diagram illustrating an example of regions that are automatically detected as touch regions by the touch region changing unit 102a;

DETAILED DESCRIPTION OF THE PREFERRED EMBODIMENTS

Hereinafter, an embodiment of a form input/output apparatus, a form input/output method, and a program according to the present invention will be explained in detail with reference to the drawings. The present invention is not limited to this embodiment.

[Configuration of Form Input/Output Apparatus]

Figure 1:
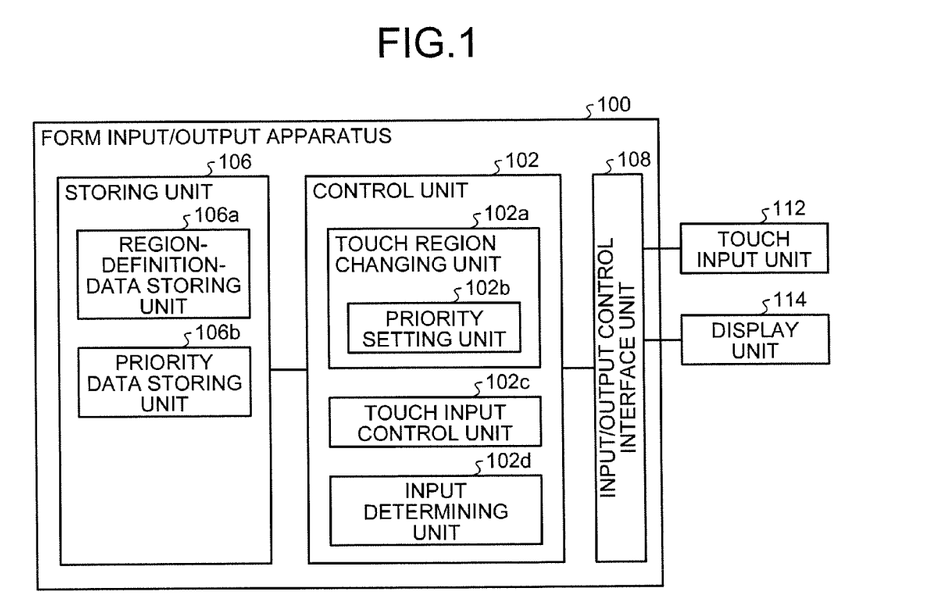
FIG. 1 is a block diagram illustrating an example of the configuration of a form input/output apparatus 100.

First, an example of the configuration of a form input/output apparatus 100 according to the present embodiment will be explained and then, an example of the form input/output apparatus 100 will be explained. FIG. 1 is a block diagram illustrating an example of the configuration of the form input/output apparatus 100 and conceptually illustrates only the portion related to the present invention in the configuration.

As illustrated in FIG. 1, the form input/output apparatus 100 in the present embodiment schematically includes a control unit 102, such as a CPU, that performs overall control of the form input/output apparatus 100, an input/output control interface unit 108 that is connected to a touch input unit 112 and a display unit 114, and a storing unit 106 that stores various pieces of data, tables, and the like, and these units are connected with each other via a given communication channel such that they can communicate with each other.

In FIG. 1, various pieces of data and tables (a region-definition-data storing unit 106a and a priority data storing unit 106b) stored in the storing unit 106 are storage units, such as a hard disk drive, and store therein various programs, tables, files, databases, and the like used for various processes.

Among these components of the storing unit 106, the region-definition-data storing unit 106a is a region-definition-data storing unit that stores region definition data. The region definition data is data that defines a touch region such that the touch region is associated with a display region that is displayed, as an input item to which a touch input can be made, on the display unit 114. The touch region is a region in which it is recognized that a touch input is made to an input item and is a non-displayed region. Typically, a display region itself of an input item is a touch region in many cases; however, the present embodiment is not limited thereto and a region whose shape, position, or size is different from a display region of an input item may be defined as a touch input. Alternatively, a touch region may be defined such that, when the position or size of a display region displayed on the display unit 114 is changed, for example, by performing a display magnification changing operation, a touch region is also changed in conjunction with this change. For example, a touch region may be defined as a region that is calculated by performing an affine transformation on a display region.

Moreover, the priority data storing unit 106b is a priority data storing unit that stores data that defines priority. For example, the priority data may be numerical data that defines the priority for each input item or may be data that is set such that the priority gradually decreases in accordance with the input item order.

Moreover, in FIG. 1, the input/output control interface unit 108 controls the touch input unit 112 and the display unit 114. In the present embodiment, the touch input unit 112 and the display unit 114 are configured integrally as a touch panel. For example, the display unit 114 may be a liquid crystal display (LCD), a plasma display (PD), an organic EL display, or the like, and the touch input unit 112 may be a transparent position input unit that is arranged on the surface of the display unit 114. As an example, the touch panel composed of the display unit 114 and the touch input unit 112 may be, for example, a resistive, capacitive, electromagnetic induction, or optical touch panel.

Moreover, in FIG. 1, the control unit 102 includes an internal memory for storing a control program, such as an OS (Operating System), a program that defines procedures of various processes and the like, and required data. The control unit 102 performs information processing for performing various processes by the above programs and the like. In the functional concept, the control unit 102 includes a touch region changing unit 102a, a touch input control unit 102c, and an input determining unit 102d.

Among them, the touch region changing unit 102a is a touch region changing unit that dynamically changes a touch region in accordance with the priority of an input item. The touch region changing unit 102a may enlarge a touch region when the priority is high or may reduce a touch region when the priority is low with reference to a touch region defined by the region definition data stored in the region-definition-data storing unit 106a. Consequently, even for an item that is small when displayed, the operability can be improved such that a touch input operation is easily performed in accordance with its priority. The touch region changing unit 102*a* may activate a touch region of an input item that is in a state where a touch region is not present in accordance with the predefined order in which an input is made to input items. More specifically, when an input is made to an input item in accordance with the order, which is predefined by the priority data stored in the priority data storing unit 106*b* and in which an input is made to input items, the touch region changing unit 102*a* may activate a touch region of the next input item, which is in a state where a touch region is not present, so as to move the state to a state where a touch region is present. Consequently, because a touch region of an input item that is in a state where a touch region is not present is activated in accordance with the predefined order in which an input is made to input items, the operability can be improved such that an input can be easily made by a user in accordance with a predetermined order in which an input is predicted to be made to input items by a user. The touch region changing unit 102*a* may include a priority setting unit 102*b*.

The priority setting unit 102*b* is a priority setting unit that sets the priority of an input item. For example, the priority setting unit 102*b* may set the priority of each input item on the basis of the priority data stored in the priority data storing unit 106*b*. Moreover, the priority setting unit 102*b* may set the priority of an input item to which an input has not been made to be higher than that of an input item to which an input has already been made. Consequently, the input operability can be improved for an input item to which an input has not been made and to which an input is made frequently by a user. Moreover, the priority setting unit 102*b* may set the priority such that it increases in accordance with the input item order. Consequently, the operability can be improved such that an input can be easily made by a user in accordance with the order in which an input is predicted to be made to input items by a user.

Moreover, when a predetermined operation is performed on a touch region, the touch region changing unit 102*a* may enlarge and display a display region without being limited to performing the above process. For example, when a portion near a touch region is pressed for a long time, the touch region changing unit 102*a* may display a pop-up of an enlarged display region. Consequently, when a predetermined operation is performed on a touch region, an enlarged display region is displayed; therefore, even in a dense portion in which items are densely arranged and an input is difficult to be made, the input operability can be improved by displaying an enlarged display region. The touch region changing unit 102*a* may detect a region corresponding to an input item and set the detected region as a touch region. For example, the touch region changing unit 102*a* may detect a frame in which an input item is included or a portion of a description for an input item and set it as a touch region. Consequently, because a region corresponding to an input item is detected and the detected region is set as a touch region, even when a touch input is made to a frame in which an input item is included or to a portion of a description for an input item, it still can be determined that an input is made to the input item. Thus, the input operability can be improved. The touch region changing unit 102*a* may store, in the region-definition-data storing unit 106*a*, region definition data in which predetected regions are defined as touch regions.

Moreover, the touch input control unit 102*c* is a touch input control unit that performs control such that at least input items are displayed on the display unit 114 and a touch input is made to the input items via the touch input unit 112 by a user. In other words, the touch input control unit 102*c* provides a graphic user interface (GUI) that enables input and output to be performed on a form by a touch operation by controlling the touch input unit 112 and the display unit 114 via the input/output control interface unit 108. For example, when the input determining unit 102*d* determines that an input is made to an input item of a check box, the touch input control unit 102*c* controls the display unit 114 such that the check box is ticked.

Moreover, the input determining unit 102*d* is an input determining unit that, when a position to which a touch input is made by the touch input control unit 102*c* is within a touch region that is changed by the touch region changing unit 102*a*, determines that an input is made to the input item. It may be such that when an input is made to an input item by a preset input method, the input determining unit 102*d* determines that an input is made to the input item without performing the process by the touch region changing unit 102*a*. For example, the preset input method may be a gesture input method associated with input items. As an example, the gesture input method using a tick may be set for input items of check boxes. Consequently, when an input is made to an input item by the preset input method, it is determined that an input is made to the input item; therefore, when an input (such as a gesture input of a tick in a check box) is made by the input method in accordance with each input item, it is easily determined that an input is made to the input item. Thus, the input operability can be improved. The gesture input is an input composed of a series of coordinates that are consecutively input by the touch input unit 112. The gesture input method may be an input method associated with the movement speed or the acceleration of consecutively input coordinates. For example, the gesture input method may be a predetermined flick input, tap input, or pan input in accordance with an input item.

The above is an example of the configuration of the form input/output apparatus 100.

[Process Performed by Form Input/Output Apparatus 100]

Figure 2:
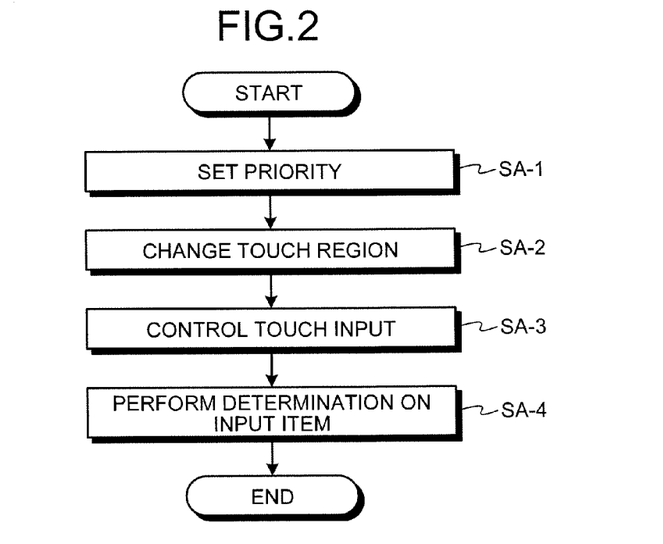
FIG. 2 is a flowchart illustrating an example of the process performed by the form input/output apparatus 100 according to the present embodiment.

Next, an example of the process performed by the form input/output apparatus 100 according to the present embodiment configured as above will be explained in detail below with reference to FIG. 2 to FIG. 12. FIG. 2 is a flowchart illustrating an example of the process performed by the form input/output apparatus 100 according to the present embodiment.

First, the priority setting unit 102*b* of the touch region changing unit 102*a* sets the priority of input items (Step SA-1). For example, the priority setting unit 102*b* may set the priority of each input item on the basis of the priority data stored in the priority data storing unit 106*b*. Moreover, the priority setting unit 102*b* may set the priority of an input item to which an input has not been made to be higher than that of an input item to which an input has already been made. Moreover, the priority setting unit 102*b* may set the priority such that it decreases in accordance with the input item order.

Figure 3:
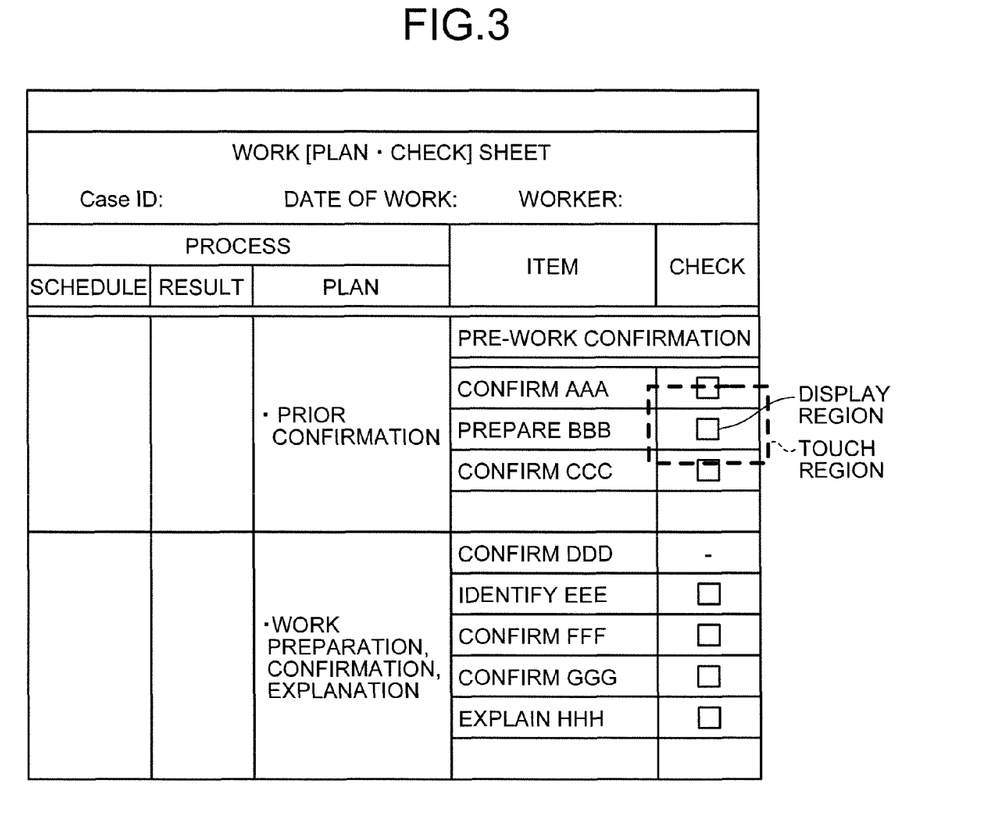

Then, the touch region changing unit 102*a* changes a touch region in accordance with the priority of the input items (Step SA-2). For example, with reference to a touch region defined by the region definition data stored in the region-definition-data storing unit 106*a*, when the priority set by the priority setting unit 102*b* is high, the touch region changing unit 102*a* may enlarge a touch region, or, when the priority set by the priority setting unit 102*b* is low, the touch region changing unit 102*a* may reduce a touch region. FIG.

3 is a diagram schematically illustrating a touch region on a display screen enlarged by the touch region changing unit 102a. The broken-line rectangle indicates a touch region. FIG. 3 illustrates the relative positional relationship between a touch region and a display screen on which input items are included, and the touch region represented by the broken-line rectangle is generally not displayed on the display screen (the same is true for the following description).

As illustrated in FIG. 3, a touch region defined by the region definition data is originally a display region of a check box type input item; however, because the priority of the input item is high, the touch region changing unit 102a enlarges the touch region such that it extends beyond the column. In this manner, the touch region changing unit 102a enlarges a touch region to a size sufficient to perform a touch operation from the actual display region for an input item that is small when displayed, such as a check box and a radio button. The touch region changing unit 102a is not limited to simply enlarging a touch region and may adjust the shape of a touch region. For example, the touch region changing unit 102a may conform the shape of a touch region to the frame in which an input item is included in the table or may enlarge a touch region to a size of a region that includes a label, a description, or the like for a check box or a radio button. Therefore, the touch region changing unit 102a may detect a region of a frame corresponding to an input item or a portion of a description or the like for an input item and set the detected region as a touch region. Moreover, the touch region changing unit 102a may activate a touch region of an input item that is in a state where a touch region is not present in accordance with the predefined order in which an input is made to input items. Moreover, when a predetermined operation is performed on a touch region, the touch region changing unit 102a may enlarge and display a display region. Specific examples thereof will be described in detail later with reference to the drawings.

The description here refers back to FIG. 2. The touch input control unit 102c performs control such that at least input items are displayed on the display unit 114 and a touch input is made to the input items via the touch input unit 112 by a user (Step SA-3). In other words, the touch input control unit 102c provides a GUI that enables input and output to be performed on a form by a touch operation by controlling the touch input unit 112 and the display unit 114 via the input/output control interface unit 108.

Then, when the position to which a touch input is made by the control by the touch input control unit 102c is within a touch region that is changed by the touch region changing unit 102a, the input determining unit 102d determines that an input is made to the input item (Step SA-4). It may be such that when an input is made to an input item by a preset input method (such as gesture input), the input determining unit 102d determines that an input is made to the input item. When the input determining unit 102d determines that an input is made to an input item such as a check box, the touch input control unit 102c performs control of, for example, displaying a tick in the check box.

The above is an explanation of an example of the process performed by the form input/output apparatus 100 according to the present embodiment. The above process may be repeatedly performed. For example, because the priority changes in accordance with an input by a user (for example, because the priority of an item to which an input has not been made becomes relatively high), the form input/output apparatus 100 can improve a touch input operation by reflecting the priority in real time by repeating the above-described process.

[Touch Region Changing Process]

Figure 4:
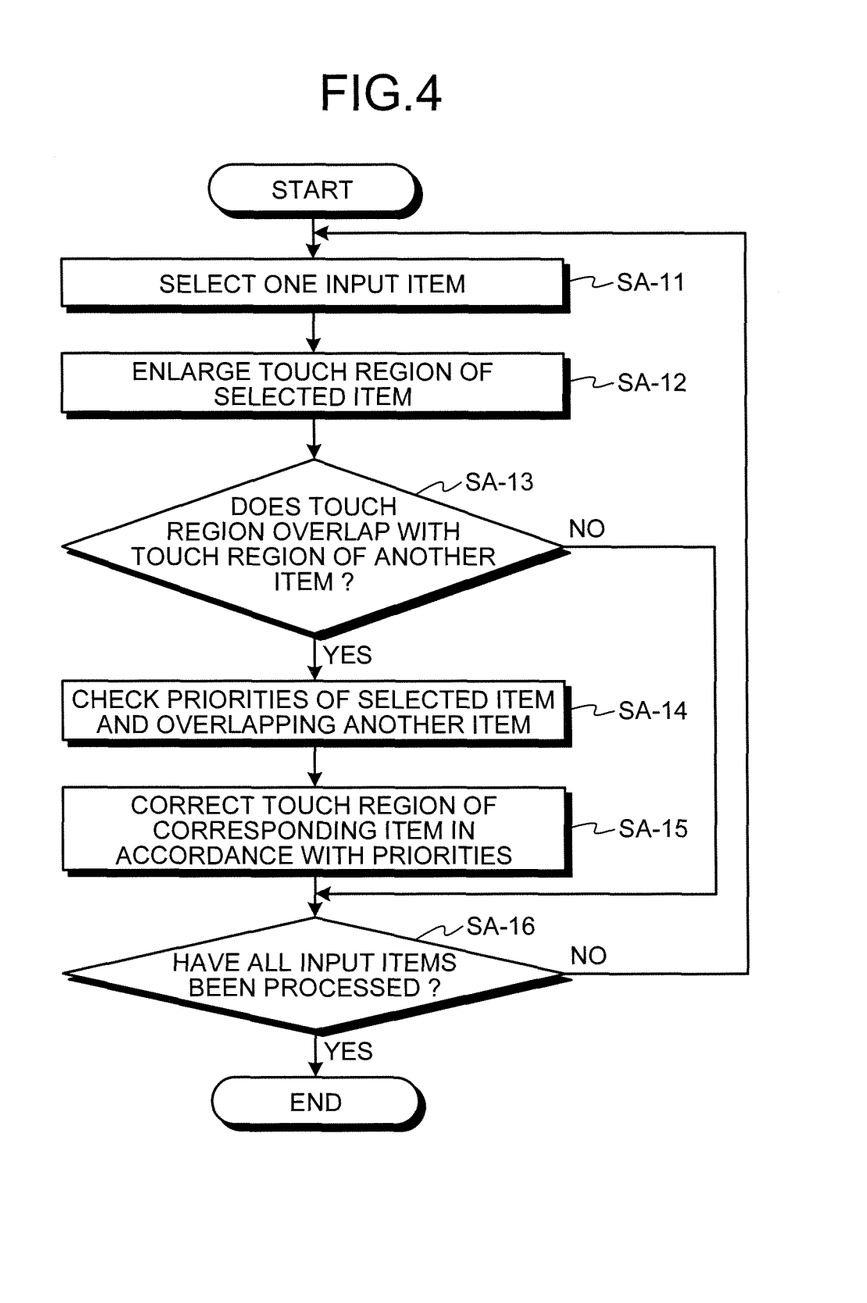
FIG. 4 is a flowchart illustrating a specific example of a touch region changing process.

Next, a more detailed specific example of the touch region changing process (Steps SA-1 and 2) in the process performed by the form input/output apparatus 100 described above will be explained with reference to FIG. 4 to FIG. 8. FIG. 4 is a flowchart illustrating a specific example of the touch region changing process.

As illustrated in FIG. 4, first, the touch region changing unit 102a selects one input item from among a plurality of input items (Step SA-11).

Then, the touch region changing unit 102a performs a process of enlarging the touch region of the selected input item (Step SA-12).

Then, the touch region changing unit 102a determines whether the enlarged touch region overlaps with a touch region of another input item (Step SA-13). When the touch region changing unit 102a determines that the touch region does not overlap with the touch region of another input item (No in Step SA-13), the following Steps SA-14 and 15 are skipped and the procedure moves to the process in Step SA-16.

When the touch region changing unit 102a determines that the touch region overlaps with the touch region of another input item (Yes in Step SA-13), the touch region changing unit 102a refers to the priority data stored in the priority data storing unit 106b and checks the priority of the selected input item and the priority of another input item by the process by the priority setting unit 102b (Step SA-14).

Figure 5:
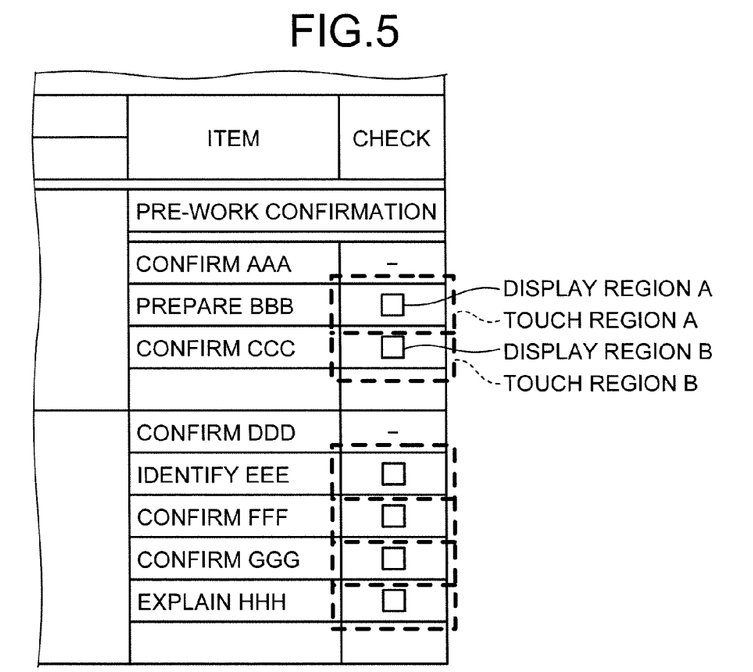
FIG. 5 is a diagram schematically illustrating touch regions corrected by the touch region changing unit 102a in a case where the upper items are prioritized.

Then, the touch region changing unit 102a corrects the touch region of the selected input item in accordance with the priorities of both input items (Step SA-15). For example, when the priority of the selected input item is lower than the priority of another input item whose touch region overlaps with that of the selected input item, the touch region changing unit 102a sets the overlapping region as a touch region of another input item. In contrast, when the priority of the selected input item is higher than the priority of another input item whose touch region overlaps with that of the selected input item, the touch region changing unit 102a sets the overlapping region as a touch region of the selected input item. FIG. 5 is a diagram schematically illustrating touch regions corrected by the touch region changing unit 102a in a case where the upper items are prioritized.

Figure 6:
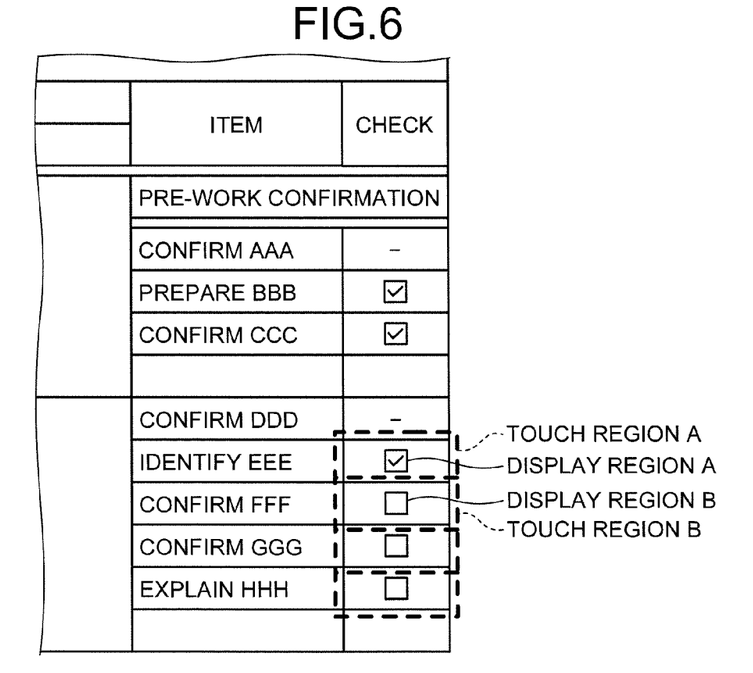
FIG. 6 is a diagram schematically illustrating touch regions corrected by the touch region changing unit 102a in a case where input items to which an input has not been made are prioritized.

As illustrated in FIG. 5, in this example, the upper items are prioritized; therefore, the priority of the input item corresponding to the display region A is higher than the priority of the input item corresponding to the display region B. Thus, the touch region changing unit 102a sets the overlapping region as the touch region A of the input item corresponding to the display region A. It is not always the case that the upper item has a higher priority and the priority may be changed in accordance with the input state by a user. FIG. 6 is a diagram schematically illustrating touch regions corrected by the touch region changing unit 102a in a case where input items to which an input has not been made are prioritized.

As illustrated in FIG. 6, in this example, input items to which an input has not been made are prioritized; therefore, the priority of the input item corresponding to the display region A, to which an input has already been made, is lower than the priority of the input item corresponding to the display region B, to which an input has not been made. Thus, the touch region changing unit 102a sets the overlapping region as the touch region B of the input item corresponding to the display region B. It is not always the case that an input item to which an input has not been made has a higher priority and the priority may be changed in accordance with the input state by a user. In the example described above, a touch region of an input item having a higher priority among input items whose touch regions overlap with each other is set; however, it is not limited to this and the touch region changing unit 102a may allocate the overlapping region to the touch regions of both input items in accordance with the priorities of both input items. For example, when the ratio between the priority of the selected input item and the priority of another input item whose touch region overlaps with that of the selected input item is 2:1, the touch region changing unit 102a may allocate the overlapping region to the touch regions of both input items with an area ratio of 2:1.

Figure 7:
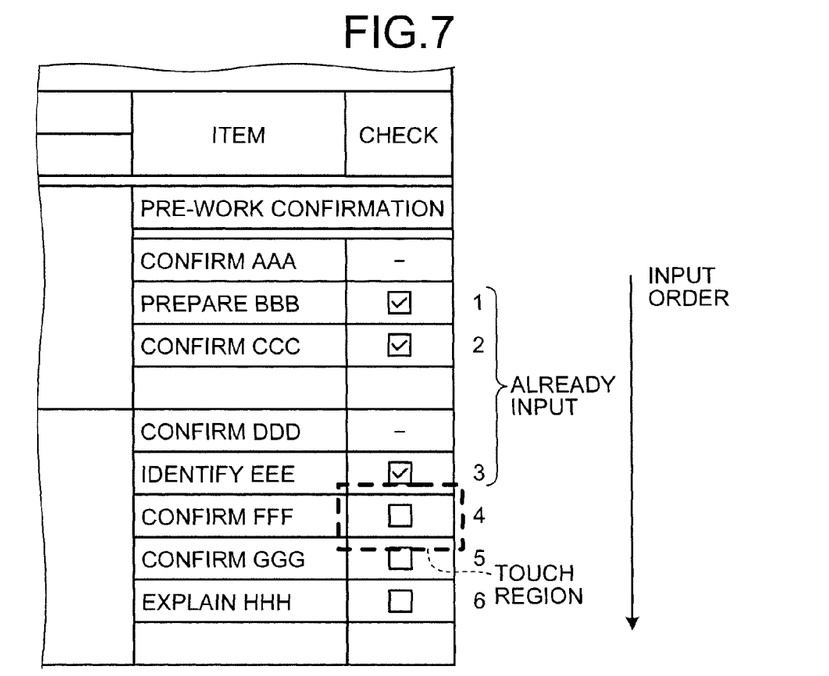
FIG. 7 is a diagram schematically illustrating an activating process of touch regions controlled by the touch region changing unit 102a in accordance with the order in which an input is made to input items.

The description here refers back to FIG. 4 again. The touch region changing unit 102a determines whether the process has been performed on all the input items (Step SA-16). When there is still an input item on which the process has not been performed (No in Step SA-16), the touch region changing unit 102a returns the process to Step SA-11 and repeats the process described above. In contrast, when the touch region changing unit 102a determines that the process has been performed on all the input items (Yes in Step SA-16), the touch region changing unit 102a ends the touch region changing process. In the touch region changing process described above, the overlapping touch regions of input items are adjusted on the basis of the priorities; however, it is not limited to this. The touch region changing unit 102a may activate a touch region of an input item that is in the inactive state where a touch region is not present in accordance with the order in which an input is made to input items. Alternatively, when a predetermined operation is performed on a touch region, the touch region changing unit 102a may enlarge and display a display region. FIG. 7 is a diagram schematically illustrating an activating process of touch regions controlled by the touch region changing unit 102a in accordance with the order in which an input is made to input items.

Figure 8:
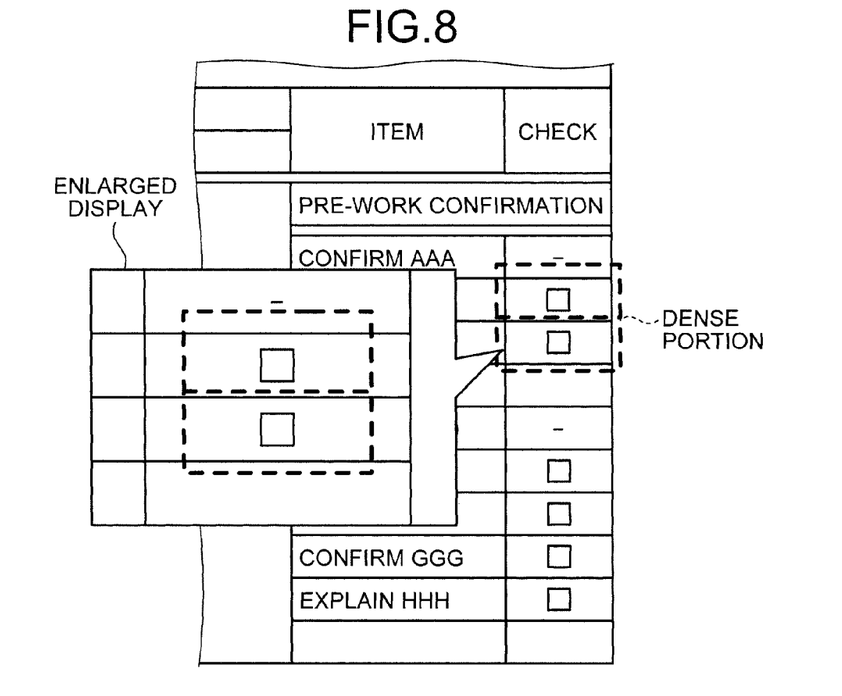
FIG. 8 is a diagram schematically illustrating an enlarging process of a touch region controlled by the touch region changing unit 102a in a case where a predetermined input is made to a portion where touch regions are densely arranged.

As illustrated in FIG. 7, the order (for example, the order from the upper item to the lower item or the order from the left item to the right item) in which an input is made to input items is predefined in the priority data storing unit 106b. When a touch input is made to an input item by a user, the touch region changing unit 102a activates a touch region of the next input item in the input order, where the next input item has been in the inactive state where a touch region is not present. In other words, the touch region changing unit 102a performs control such that a touch region is not activated as long as the operation for the last input item has not been completed. FIG. 8 is a diagram schematically illustrating an enlarging process of a touch region controlled by the touch region changing unit 102a in a case where a predetermined input is made to a portion where touch regions are densely arranged.

Figure 9:
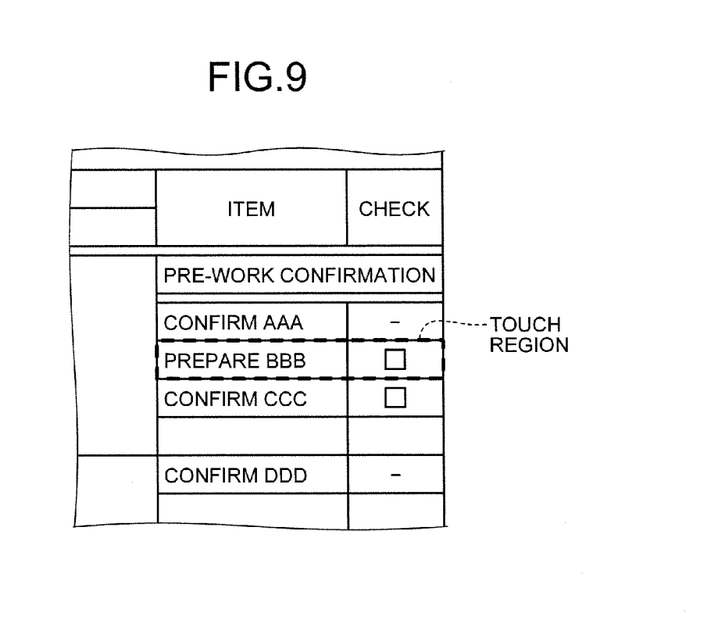
Figure 10:
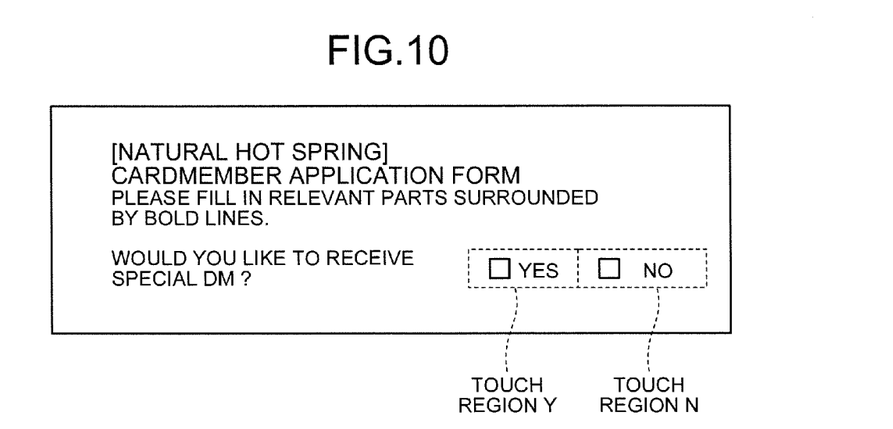

As illustrated in FIG. 8, in the dense portion in which a plurality of input items are densely arranged, it is difficult to perform a touch input on one input item. Thus, as illustrated in FIG. 8, when a predetermined input operation (such as long press) is performed on the dense portion, the touch region changing unit 102a may enlarge and display the dense portion. Consequently, a user can easily perform a touch input on one input item in the enlarged display. The touch region changing unit 102a may automatically detect a region corresponding to an input item and set the detected region as a touch region. FIG. 9 and FIG. 10 are diagrams illustrating examples of regions that are automatically detected as touch regions by the touch region changing unit 102a.

As illustrated in FIG. 9, the touch region changing unit 102a may automatically detect a frame in which an input item, such as a check box, is included or a portion of a description for an input item and set it as a touch region. Moreover, as illustrated in FIG. 10, the touch region changing unit 102a may automatically detect portions of descriptions ("Yes" and "No" in FIG. 10) for input items of check boxes and set them as touch regions Y and N, respectively. In the touch region changing process, the touch region changing unit 102a may store the region definition data, in which predetected regions are defined as touch regions, in the region-definition-data storing unit 106a without being limited to performing the automatic detecting process of a touch region each time.

[Gesture Input Process]

Next, an example of the gesture input process performed by the input determining unit 102d will be explained below with reference to FIG. 11 and FIG. 12. The gesture input is an input composed of a series of coordinates that are consecutively input by the touch input unit 112. The gesture input method may be a flick input, tap input, pan input, or the like associated with the movement speed or the acceleration of consecutively input coordinates.

When the position to which a touch input is made by the touch input control unit 102c is within a touch region that is changed by the touch region changing unit 102a, the input determining unit 102d determines that an input is made to the input item. However, for example, in a state where a plurality of input items are densely arranged, it is difficult to determine to which input item an input is made. Therefore, it may be such that when an input is made to an input item by an input method that is preset for each input item, the input determining unit 102d determines that an input is made to the input item. FIG. 11 is a diagram for explaining a gesture input process performed on input items of check boxes.

Figure 11:
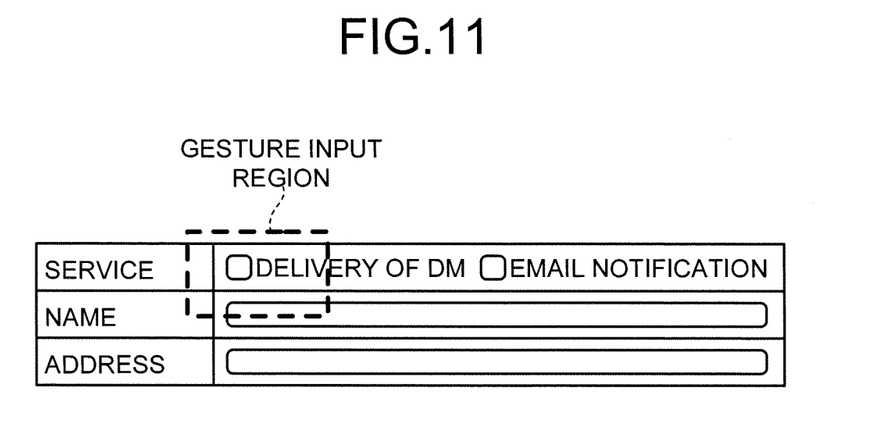
FIG. 11 is a diagram for explaining a gesture input process performed on input items of check boxes.

As illustrated in FIG. 11, in the case where various input items are densely arranged (in the example of FIG. 11, text items, check boxes, and the like), when a predetermined gesture input in accordance with an input item is made, the input determining unit 102d determines that a touch input is made to the corresponding input item. In the example in FIG. 11, when a gesture input of a tick mark is made in the gesture input region near the check box input item, the input determining unit 102d determines that the gesture input is made to the check box input item. The gesture can be arbitrarily set for each item. FIG. 12 is a diagram illustrating types of gestures.

Figure 12:
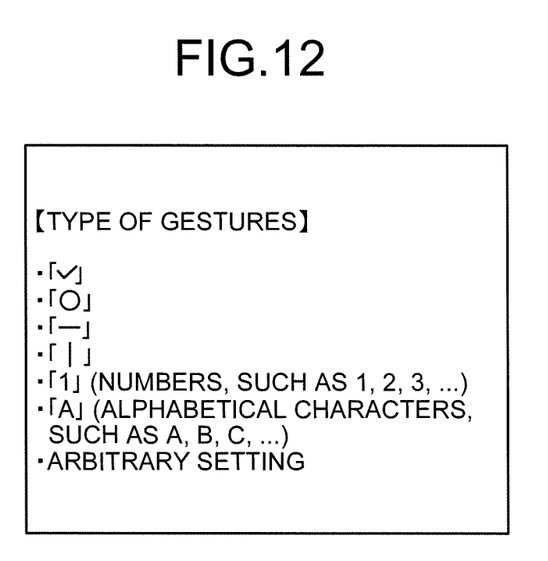
FIG. 12 is a diagram illustrating types of gestures.

As illustrated in FIG. 12, the gesture is not limited to a tick mark. When a gesture input of "O", "-", "|", numbers, such as "1", or alphabetical characters, such as "A", is made, the input determining unit 102d may determine that an input is made to a pre-associated input item. For example, an input item of a check box may be associated with a gesture input of a tick mark and an input item of a radio button may be associated with a tap input of "•".

The above is an explanation of the present embodiment.

According to the present embodiment, region definition data, which defines a touch region, is stored such that the touch region is associated with a display region that is displayed, as an input item to which a touch input can be made, on a display unit, the touch region being a region in which it is recognized that a touch input is made to the input item, the touch region is dynamically changed in accordance with a priority of the input item, control is performed such that at least the input item is displayed on the display unit and a touch input is made to the input item via a touch input unit by a user, and, when a position to which a touch input is made is within the changed touch region, it is determined that an input is made to the input item. Consequently, the present embodiment has an effect where the operability can be immediately improved even when a touch input is made to items in the forms or the like, which are small when displayed and are densely arranged.

[Other Embodiments]

The embodiment of the present invention has been described above, and the present invention may be implemented by various different embodiments within the scope of the technical idea described in the claims in addition to the above-described embodiment.

For example, the form input/output apparatus 100 may be a server or the like connected via a network, perform a process in response to the request from a client terminal that is a device independent from the form input/output apparatus 100, and return the processing results to the client terminal.

Moreover, among the processes described in the embodiment, all or part of the processes described as an automatic process may be performed manually or all or part of the processes described as a manual process may be performed automatically by well-known methods.

In addition thereto, the process procedures, the control procedures, the specific names, the information including registered data of each process and parameters, such as retrieval conditions, the screen examples, and the database configurations, described in the literatures and drawings above may be arbitrarily modified unless otherwise indicated.

Furthermore, each component of the form input/output apparatus 100 illustrated in the drawings is formed on the basis of functional concept, and is not necessarily configured physically the same as those illustrated in the drawings.

For example, all or any part of the processing functions that the devices in the form input/output apparatus 100 have, and particularly each processing function performed by the control unit 102, may be implemented by a CPU (Central Processing Unit) and a program interpreted and executed by the CPU, or may be implemented as hardware by wired logic. The program is recorded in a non-transitory computer-readable recording medium including programmed instructions for causing a computer to execute the method according to the present invention, which will be described later, and is mechanically read by the form input/output apparatus 100 as necessary. Specifically, the storing unit 106, such as a ROM and an HDD, or the like records a computer program for providing instructions to the CPU in cooperation with the OS (Operating system) and for executing various processes. This computer program is executed by being loaded into a RAM and configures the control unit in cooperation with the CPU.

Moreover, this computer program may be stored in an application program server that is connected to the form input/output apparatus 100 via a given network, and all or part thereof may be downloaded as necessary.

Furthermore, the program according to the present invention may be stored in a computer-readable recording medium and may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blue-ray Disc.

Moreover, the "program" refers to a data processing method written in any language and any description method and is not limited to a specific format, such as source codes and binary codes. The "program" is not necessarily configured unitarily and includes a program constituted in a dispersed manner as a plurality of modules or libraries and a program that implements its functions in cooperation with a different program representative of which is an OS (Operating System). Well-known configurations and procedures can be used for the specific configuration and reading procedure for reading a recording medium, the installation procedure after reading a recording medium, or the like in each device illustrated in the present embodiment.

Various databases and the like (the region-definition-data storing unit 106a and the priority data storing unit 106b) stored in the storing unit 106 are a storage unit, examples of which is a memory device, such as a RAM and a ROM, a fixed disk drive, such as a hard disk, a flexible disk, and an optical disk, and stores various programs, tables, databases, files for web pages, and the like that are used for various processes or providing websites.

Moreover, the form input/output apparatus 100 may be configured as an information processing apparatus, such as well-known personal computer and workstation, or may be configured by connecting a given peripheral device to the information processing apparatus. Moreover, the form input/output apparatus 100 may be realized by installing software (including program, data, and the like) that causes the information processing apparatus to realize the method in the present invention.

A specific form of distribution/integration of the devices is not limited to those illustrated in the drawings and it may be configured such that all or part thereof is functionally or physically distributed or integrated, by arbitrary units, depending on various additions or the like or depending on functional load. In other words, the above-described embodiments may be performed by arbitrarily combining them or the embodiments may be selectively performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A form input/output apparatus that includes at least a touch panel, a display, a storage, and a processor, wherein:
the storage stores region definition data that defines a touch region such that the touch region is associated with a display region that is displayed, as an input item of a form to which a touch input is capable of being made, on the display, the touch region being a region capable to recognize that a touch input is made to the input item;
the processor is configured to:
dynamically change the touch region in accordance with a priority of the input item,
perform control such that at least the input item is displayed on the display and a touch input is made to the input item via the touch panel by a user,
when a position to which a touch input is made by the processor is within the touch region that is changed by the processor, determine that an input is made to the input item, and
set a priority of an input item to which an input has not been made to be higher than a priority of an input item to which an input has already been made;

content displayed by the display region prior to the change of the touch region and content displayed by the display region after the input made to the input item are different from each other;

when a long press, which is a predetermine operation, is performed on the touch region, the processor enlarges and displays the display region; and the input item includes a check box or a radio button.

2. The form input/output apparatus according to claim 1, wherein when the priority is high, the processor enlarges the touch region.

3. The form input/output apparatus according to claim 1, wherein the processor increases a priority in accordance with an input item order.

4. The form input/output apparatus according to claim 1, wherein the processor activates the touch region of the input item that is in a state where the touch region is not present in accordance with a predefined input order in which an input is made to the input item.

5. The form input/output apparatus according to claim 1, wherein the processor detects a region corresponding to the input item and sets detected region as the touch region.

6. The form input/output apparatus according to claim 1, wherein when an input is made to the input item by a preset input method, the processor determines that an input is made to the input item.

7. A form input/output method performed by a form input/output apparatus that includes at least a touch panel, a display, a storage, and a processor, wherein:

the storage stores region definition data that defines a touch region such that the touch region is associated with a display region that is displayed, as an input item of a form to which a touch input is capable of being made, on the display, the touch region being a region capable to recognize that a touch input is made to the input item;

the method includes
  a touch region changing step of dynamically changing the touch region in accordance with a priority of the input item,
  a touch input controlling step of performing control such that at least the input item is displayed on the display and a touch input is made to the input item via the touch panel by a user,
  an input determining step of, when a position to which a touch input is made in the touch input controlling step is within the touch region that is changed in the touch region changing step, determining that an input is made to the input item,
  a priority setting step of setting a priority of an input item to which an input has not been made to be higher than a priority of an input item to which an input has already been made, and
  an enlarging step of, when a long press, which is a predetermine operation, is performed on the touch region, enlarging and displaying the display region;

the touch region changing step, the touch input controlling step, and the input determining step are performed by the processor;

content displayed by the display region prior to the change of the touch region and content displayed by the display region after the input made to the input item are different from each other; and the input item includes a check box or a radio button.

8. A non-transitory tangible computer-readable recording medium that stores therein a computer program that is executed by a form input/output apparatus that includes at least a touch panel, a display, a storage, and a processor, wherein:

the storage stores region definition data that defines a touch region such that the touch region is associated with a display region that is displayed, as an input item of a form to which a touch input is capable of being made, on the display, the touch region being a region capable to recognize that a touch input is made to the input item;

the program causes the processor to execute
  a touch region changing step of dynamically changing the touch region in accordance with a priority of the input item,
  a touch input controlling step of performing control such that at least the input item is displayed on the display and a touch input is made to the input item via the touch panel by a user,
  an input determining step of, when a position to which a touch input is made in the touch input controlling step is within the touch region that is changed in the touch region changing step, determining that an input is made to the input item,
  a priority setting step of setting a priority of an input item to which an input has not been made to be higher than a priority of an input item to which an input has already been made, and
  an enlarging step of, when a long press, which is a predetermine operation, is performed on the touch region, enlarging and displaying the display region;

content displayed by the display region prior to the change of the touch region and content displayed by the display region after the input made to the input item are different from each other; and the input item includes a check box or a radio button.

* * * * *